United States Patent
Chang et al.

(10) Patent No.: US 7,398,507 B2
(45) Date of Patent: Jul. 8, 2008

(54) METHOD OF AUTOMATIC SYNTHESIS OF SEQUENTIAL QUANTUM BOOLEAN CIRCUITS

(75) Inventors: Li-Kai Chang, Taipei (TW); Fu-Chiung Cheng, Taipei (TW)

(73) Assignee: Tatung Company, Taipei (TW)

( * ) Notice: Subject to any disclaimer, the term of this patent is extended or adjusted under 35 U.S.C. 154(b) by 143 days.

(21) Appl. No.: 11/430,987

(22) Filed: May 10, 2006

(65) Prior Publication Data

US 2007/0266347 A1    Nov. 15, 2007

(51) Int. Cl.
*G06F 17/50* (2006.01)
(52) U.S. Cl. ............................................. 716/18; 716/2
(58) Field of Classification Search ...................... 716/1, 716/2, 18
See application file for complete search history.

(56) References Cited

U.S. PATENT DOCUMENTS

| | | | | |
|---|---|---|---|---|
| 6,044,211 | A * | 3/2000 | Jain | 716/18 |
| 6,728,945 | B1 * | 4/2004 | Wang | 716/18 |
| 2002/0178432 | A1 * | 11/2002 | Kim et al. | 716/18 |
| 2004/0139416 | A1 * | 7/2004 | Riedel et al. | 716/18 |

OTHER PUBLICATIONS

Li-Kai Chang et al., "Automatic Synthesis of Composable Sequential Quantum Boolean Circuits", 2005 IEEE International Conference, pp. 289 (totally 6 pages).

* cited by examiner

*Primary Examiner*—Jack Chiang
*Assistant Examiner*—Binh C Tat
(74) *Attorney, Agent, or Firm*—Bacon & Thomas, PLLC

(57) ABSTRACT

A method of automatic synthesis of sequential quantum Boolean circuits for transferring a self-timed circuit into a sequential quantum Boolean circuit and synthesizing the sequential quantum Boolean circuit, which comprises the steps of: (A) transferring the self-timed circuit into a state graph having M state nodes, where M is an integer; (B) determining whether the state graph is reversible; (C) encoding the M state nodes by using a unique state encoding when step (B) decides that the state graph is reversible, and producing a unique state coding reversible state graph; (D) transferring the unique state coding reversible state graph (USCRSG) into a corresponding self-timed transformation graph; (E) performing a state decomposition on the self-timed transformation graph and producing a decomposed self-timed transformation graph; and (F) constructing a quantum Boolean circuit of the decomposed self-timed transformation graph.

10 Claims, 8 Drawing Sheets

METHOD OF AUTOMATIC SYNTHESIS OF SEQUENTIAL QUANTUM BOOLEAN CIRCUITS

BACKGROUND OF THE INVENTION

1. Field of the Invention

The invention relates to the technical field of Boolean circuit synthesis and, more particularly, to a method of automatic synthesis of sequential quantum Boolean circuits.

2. Description of Related Art

Due to the discovery of Shor's prime factorization and Grover's fast database search method, quantum computing becomes one of the most rapidly expanding technology fields. To perform quantum method, the required unitary operations should be expressed as a sequence of basic operations which can be implemented by a quantum computer. To implement a quantum computer, quantum Boolean circuits need to be constructed first.

The major differences between conventional circuits and quantum ones are their logic gates and wires. Firstly, conventional circuits are based on AND, OR and NOT gates and quantum Boolean circuits are based on NOT, Controlled-Not and Controlled-Controlled-Not gates (i.e. Toffoli gates). Secondly, the wires in conventional circuits are used to connect components. This is very different in quantum Boolean circuits because wires represent time evolution.

Due to the differences between the conventional circuits and the quantum ones, there is a method to synthesize combinational quantum Boolean circuits based on transformation tables. As in the cited method, any general m-to-n bit combinational Boolean logic can be synthesized by using Toffoli gates. In the meantime, there are many methods proposed for synthesizing the combinational quantum Boolean circuits. However, there are no related works on synthesizing sequential circuit behaviors into quantum Boolean circuits yet. Therefore, it is desirable to provide a method of automatic synthesis of sequential quantum Boolean circuits to mitigate and/or obviate the aforementioned problems.

SUMMARY OF THE INVENTION

The object of the invention is to provide a method capable of automatically synthesizing sequential quantum Boolean circuits.

To achieve the object, there is provided a method of automatic synthesis of sequential quantum Boolean circuits, which is used to transfer a self-timed circuit into a sequential quantum Boolean circuit (SQBC) and synthesize the SQBC, the method comprising the steps of: (A) transferring the self-timed circuit into a state graph having M state nodes, where M is an integer; (B) determining whether the state graph is reversible; (C) encoding the M state nodes by using a unique state encoding when step (B) decides that the state graph is reversible, and producing a unique state coding reversible state graph (USCRSG); (D) transferring the unique state coding reversible state graph (USCRSG) into a corresponding self-timed transformation graph (STTG); (E) performing a state decomposition on the self-timed transformation graph (STTG) and producing a decomposed self-timed transformation graph (STTG); and (F) constructing a quantum Boolean circuit of the decomposed self-timed transformation graph (STTG).

Other objects, advantages, and novel features of the invention will become more apparent from the following detailed description when taken in conjunction with the accompanying drawings.

BRIEF DESCRIPTION OF THE DRAWINGS

FIG. 2($b$) is a schematic view of a quantum Boolean circuit (QBC) with N quantum bits;

FIG. 3($b$) is a schematic view of a state graphs (SG) of a modulo-3 element;

FIG. 5($b$) is a schematic view of a self-timed transformation graph (STTG) corresponding to the USCRSG in the FIG. 5($a$) in accordance with the invention;

DETAILED DESCRIPTION OF THE PREFERRED EMBODIMENT

Figure 1:
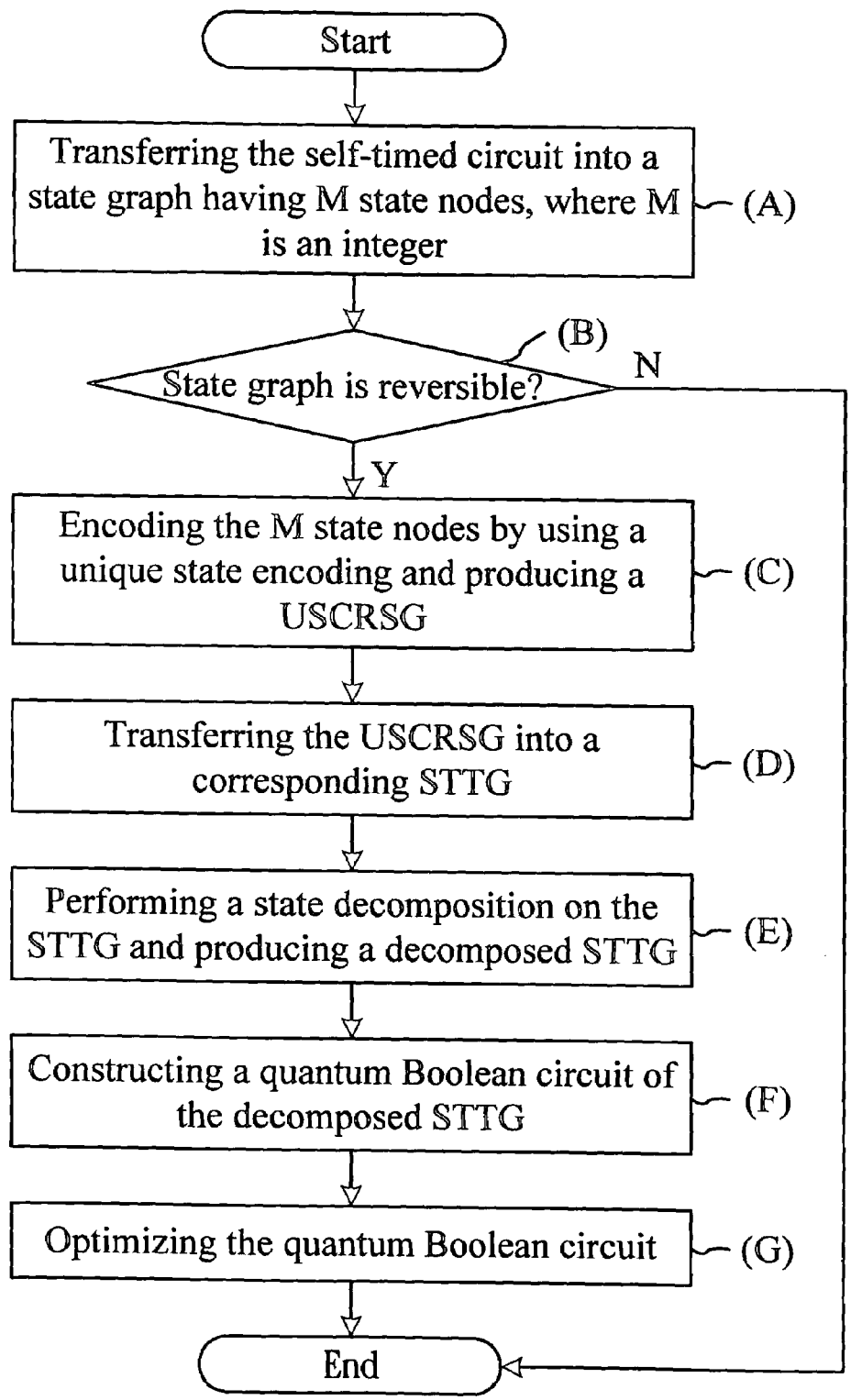
FIG. 1 is a flowchart of a method of automatic synthesis of sequential quantum Boolean circuits in accordance with the invention.

FIG. 1 is a flowchart of a method of automatic synthesis of sequential quantum Boolean circuits in accordance with the invention. The method is used to transfer a self-timed circuit into a sequential quantum Boolean circuit (SQBC) and synthesize the SQBC. As shown in FIG. 1, step (A) transfers the self-timed circuit into a state graph having M state nodes, where M is an integer.

Circuit design and data representation in conventional circuits and quantum ones are different in nature. In conventional circuits, data are represented by bits and circuits are networks of logic gates while in quantum computers data are represented by quantum bits (qubits) and quantum circuits are made of a sequence of unitary operations which are represented by quantum gates and quantum wires.

In conventional gates, any function can be realized by NAND gates alone, which is thus known as a universal gate. In quantum Boolean circuits, any multiple qubits logic can be composed from controlled-NOT (CNOT) type logic gates.

In order to construct quantum Boolean circuits, any conventional circuit can be replaced by an equivalent circuit of only reversible element, by making use of a reversible gate known as the Toffoli gate.

Figure 2A:
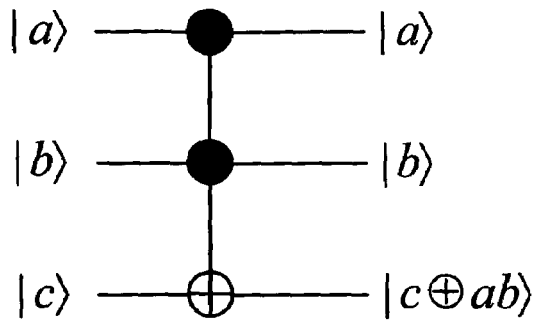
FIG. 2($a$) is a schematic view of a Toffoli gate.

The Toffoli gate, shown in FIG. 2($a$), has three qubits. The third qubit is the target qubit which is flipped when both control qubits (i.e. the first two qubits) are set to 1. The action of the Toffoli gate can be summarized as $|a, b, c\rangle \rightarrow |a, b, c \oplus ab\rangle$. Furthermore, applying the Toffoli gate twice has the effect of $|a, b, c\rangle \rightarrow |a, b, c \oplus ab\rangle \rightarrow |a, b, c\rangle$, and thus the Toffoli gate is reversible.

In quantum computing, the behaviors of a quantum circuit are represented by a sequence of unitary operations applied to the qubits of the quantum circuit. The results can be read out by measuring the quantum states of the qubits. That is, quantum circuits consist of a sequence of unitary operations represented by quantum gates and quantum wires.

Figure 2B:
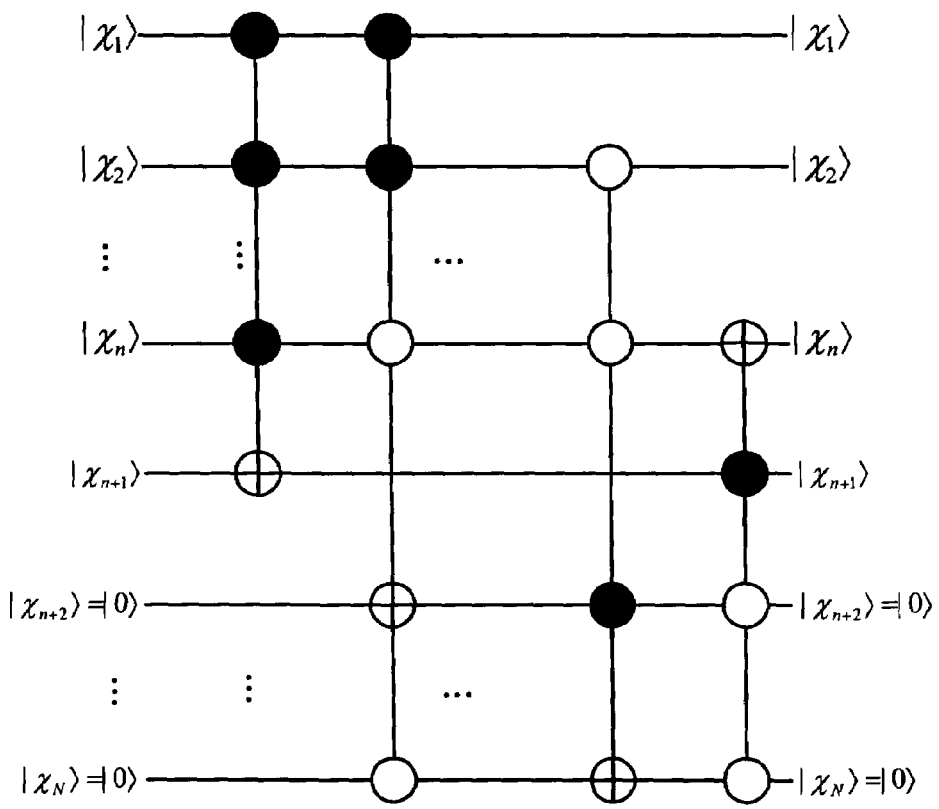

FIG. 2(b) shows a quantum Boolean circuit (QBC) with N qubits, denoted by $|\chi_1\rangle|\chi_2\rangle \ldots |\chi_N\rangle$. The sequence of unitary operations are applied from left to right to corresponding qubits $|\chi_1\rangle$ to $|\chi_N\rangle$. The qubits $|\chi_1\rangle|\chi_2\rangle \ldots |\chi_N\rangle$ on the left-head-side is regarded as the input to the quantum circuit, and the states on the right-head-side keep the final result. A quantum Boolean circuit (QBC) can use any finite number of auxiliary qubits for storing intermediate states.

There are three different kinds of logic gates in Toffoli gates: one-controlled gates (denoted by closed circles, ○), zero-controlled gates (denoted by open circles, ○) and target gates which are similar to sum of mod 2 (denoted by open circles with plus sign inside, ⊕). When all controlled gates in the same wire (i.e. quantum operation) are active, the target gate flips.

The operations of a quantum Boolean circuit (QBC) are quite different from those of a conventional synchronous circuit which are controlled by a global clock. In quantum Boolean circuit (QBC), a sequence of operations are applied to the qubits and are not controlled by a global clock. Furthermore, a quantum operation cannot be applied to a QBC unless the previous one is complete and the quantum system is stable. This behavior is similar to the fundamental mode of asynchronous circuits. In the fundamental mode of asynchronous circuits, when the inputs of logic block are triggered, outputs are changed by the inputs and current states, and the next states of circuits are stored in the latches. The changes in inputs are forbidden until the system is stable.

State graphs (SGs) can be used to specify the behaviors of circuits. State graphs are directed binary coded graphs containing states (or nodes) and directed edges. An edge in SGs is labeled with input or output signal transitions. Each signal transition can be represented as $x_i+$ or $x_i-$ for the rising ($0 \to 1$) or falling ($1 \to 0$) transition of signal $x_i$.

A node in SGs represents one state of the circuit. Each states $\in$ S is labeled with binary code $<s(1), s(2), \ldots, s(n)>$, and the value of $s(i)$ is 0 or 1, i.e. $s(i) \in \{0, 1\}$. The state binary code is formed by an input binary code and an output binary code. Suppose the circuit has m-bits input and n-bits output. The input and output binary codes of node i are defined as follows:

$ib(i) \in \{0, 1\}^m$ is the input binary code function, and
$ob(i) \in \{0, 1\}^n$ is the output binary code function.

The state binary code of node i, $sbc(i)$, can be defined as $ib(i)+ob(i)$ where+ denotes the concatenation. And, the k-th state bit of node i is denoted as $sbc(i, k)$.

Figure 3A:
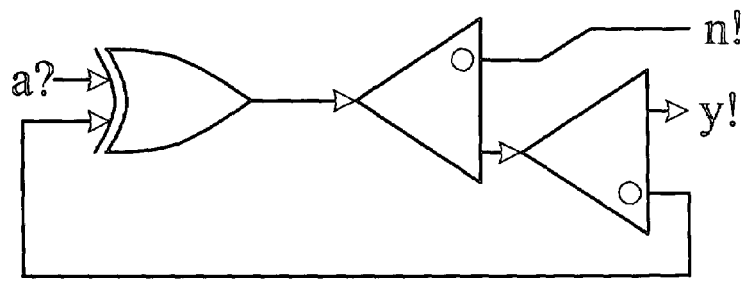
FIG. 3($a$) is a schematic view of a modulo-3 element which has one input a and two outputs y (yes) and n (no)
Figure 3B:
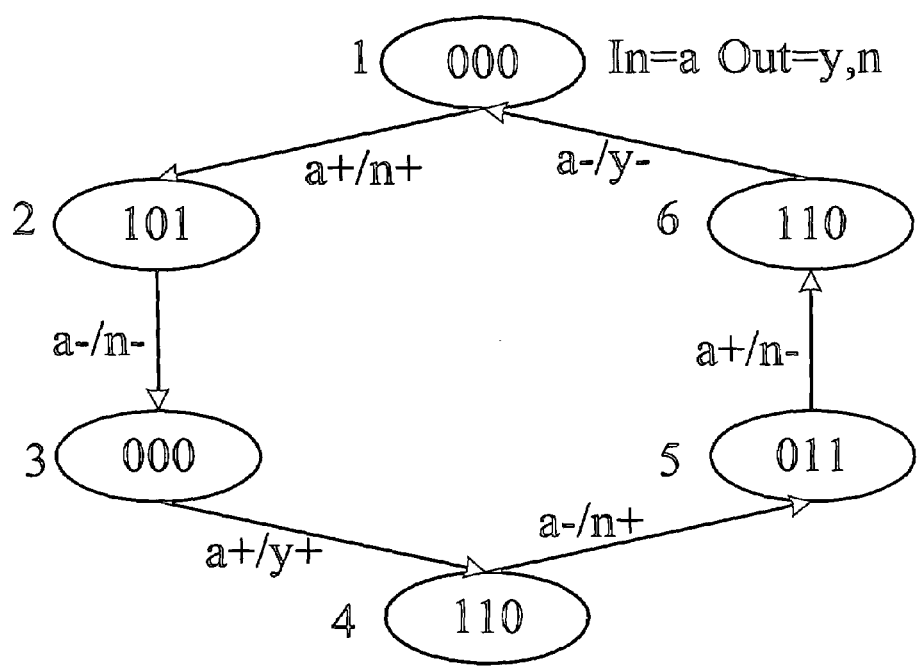

FIG. 3(a) is a schematic view of a modulo-3 element which has one input a and two outputs, y (yes) and n (no). As shown in FIG. 3(a), signal a is labeled with a "?" to indicate that signal a is an input signal, and signal y and n are labeled with a "!" to indicate that the signals, y and n, are output signals respectively. FIG. 3(b) is a schematic view of a state graphs (SG) of the modulo-3 element having 6 states and 6 edges. The state binary code of node 1 is "000" since the $ib(1)$ is '0' (i.e. a=0) and $ob(1)$ is "00" (i.e. y=0, n=0).

Step (B) determines whether the state graph is reversible. When the state graph is reversible, step (C) is executed; and conversely, the method is terminated. The quantum Boolean circuits (QBCs) must consist of only reversible gates; therefore, to be synthesizable for QBCs, a SG must have reversible property.

Figure 4:
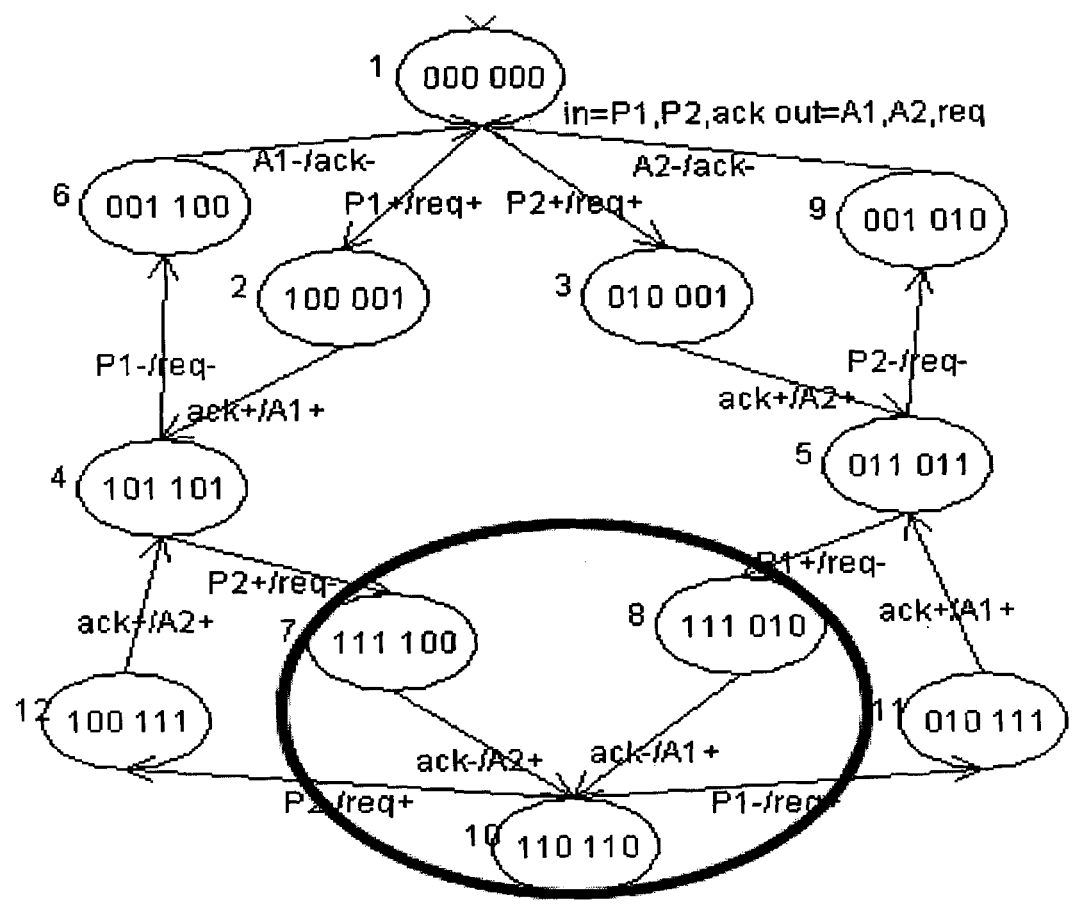
FIG. 4 is a schematic view of an irreversible state graphs (SG)

A SG is reversible if for any node j in the SG either the input of the node j is equal to 1 (i.e. indegree(j)=1) or the input of the node j is large than 1 (i.e. indegree(j)>1) and for all source nodes of j, $i_1, i_2, \ldots, i_k$, $ob(i_1)=ob(i_2)= \ldots =ob(i_k)$. The SG shown in FIG. 3(b) is reversible since the in-degree of all nodes in the SG is equal to one. FIG. 4 is a schematic view of an irreversible SG This SG cannot be synthesized since node 10 has two source nodes, node 7 and node 8 (indegree(j)>1) and ob(node 7)≠ob(node 8).

Step (C) encodes the M state nodes of the state graph by using a unique state encoding when step (B) decides that the state graph is reversible, and produces a unique state coding reversible state graph (USCRSG).

Since an unambiguous state assignment is needed to construct both conventional circuits and QBCs, unique state encoding (USC) method is applied first to avoid unique state encoding (USC) conflict. Two states (nodes) are called USC-conflict states (nodes) if and only if their state binary codes are the same. To satisfy the USC requirement, different auxiliary state bits are appended to the original state binary code to distinguish states in SGs. If there are s states in the SG and the number of USC-conflict states for each state binary code is $d_i$ ($0 \leq i < s$), then the number of auxiliary state bits needed is $k=\lceil \log\lceil \max(d_i) \rceil \rceil$, where $\lceil \ \rceil$ is a ceiling function.

Figure 5A:
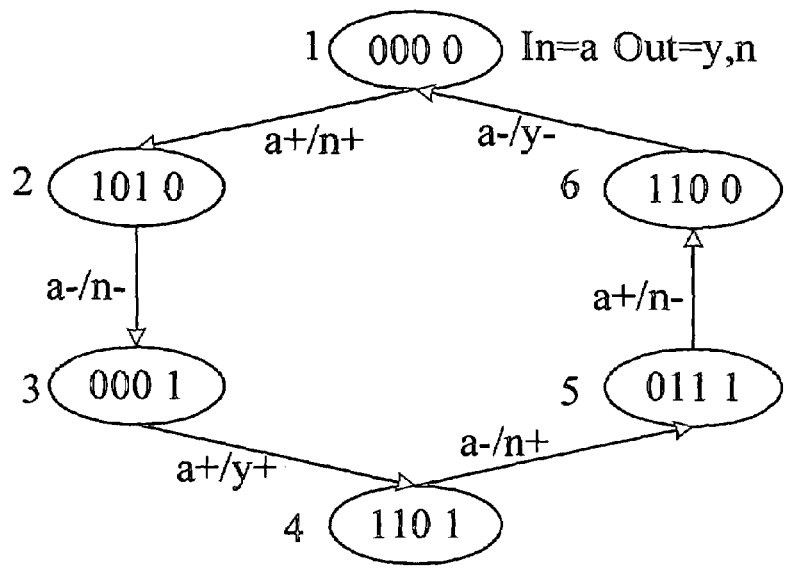
FIG. 5($a$) is a schematic view of a unique state coding reversible state graph (USCRSG) corresponding to a SG in the FIG. 3($b$) in accordance with the invention.

As shown in FIG. 3(b), the states 1, 3 and states 4, 6 in the SG of modulo-3 element have the same state binary codes. Thus one auxiliary state bit is appended to each node in the SG FIG. 5(a) is a schematic view of a unique state coding reversible state graph (USCRSG) corresponding to the SG in the FIG. 3(b). As shown in FIG. 5(a), the auxiliary state bit appended to states 1 and 6 is '0' and to states 3 and 4 is '1'.

Step (D) transfers the unique state coding reversible state graph (USCRSG) into a corresponding self-timed transformation graph (STTG). For a unique state coding reversible state graph (USCRSG) specifying a sequential circuit with m-bit input, n-bit output and e edges (i.e. e next-state functions), the corresponding self-timed transformation graph (STTG) is a hyper-graph which consists of e transformation sub-graphs (TSG) and each TSG consists of two nodes connecting to each other by two direct edges. A USCRSG is transformed into a STTG which is the specification for constructing QBC.

Each edge in a STTG represents a transition from one state to another. For each edge e with source node i and target node j in a USCRSG, a corresponding transformation sub-graph (TSG) is formed for the target node j. The TSG consists of two new nodes source and target connecting to each other by two directed edges (i.e. source→target, target→source). These two direct edges are called quantum links and are marked in dashed lines. The quantum states for the source node and target node in each TSG are reversible due to the quantum links while applying quantum operations.

The state binary codes of the source and target nodes are labeled with $ib(j)+ob(i)+ab(i)$ and $ib(j)+ob(j)+ab(j)$, respectively. The $ab(i)$ is the binary code function of auxiliary state bits which is similar to $ib(i)$ and $ob(i)$.

Figure 5B:
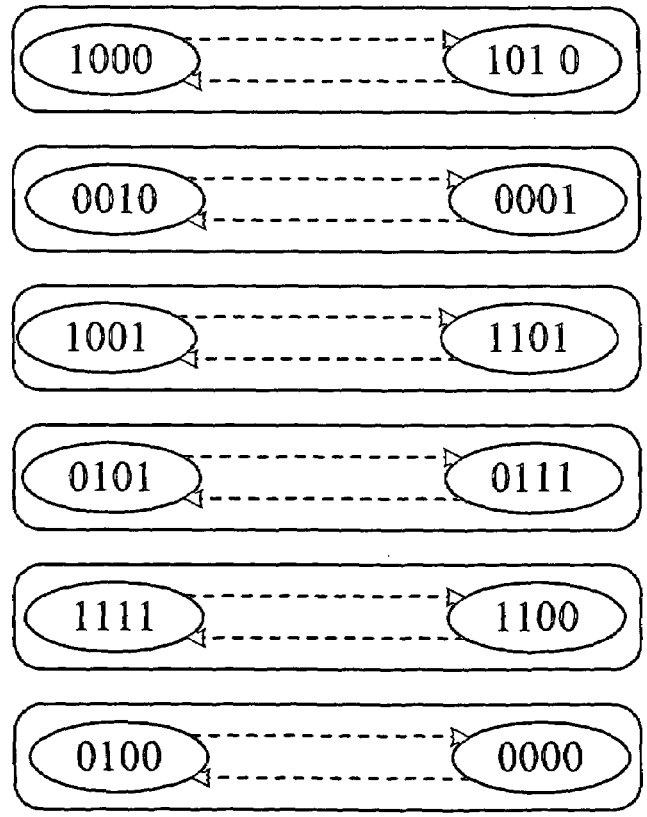

FIG. 5(b) is a schematic view of a self-timed transformation graph (STTG) corresponding to the USCRSG in the FIG. 5(a) in accordance with the invention. The USCRSG of modulo-3 element, shown in FIG. 5(a), can be transferred to the STTG, shown in FIG. 5(b). The STTG contains 6 TSGs. The dashed lines connected two nodes in a TSG are the quantum links.

To construct QBCs based on Toffoli gates, the state binary codes of adjacent nodes in the TSGs must differ in only one bit. This requirement can be retained by performing state decomposition. Step (E) performs a state decomposition on the self-timed transformation graph (STTG) and producing a decomposed self-timed transformation graph (STTG).

If two nodes in a TSG have Hamming distances ($H_d$) more than one, they have to be decomposed and some appropriate states are added between them so that any adjacent states differ only one bit. Furthermore, the added states must be never used in the STTG.

Taking the STTG of modulo-3 element, shown in FIG. 5(b), as an example, the Hamming distances ($H_d$) of the states of the 3-rd and 6-th TSGs is equal to 2, then the states of the 3-rd and 6-th TSGs have to be decomposed.

Figure 6:
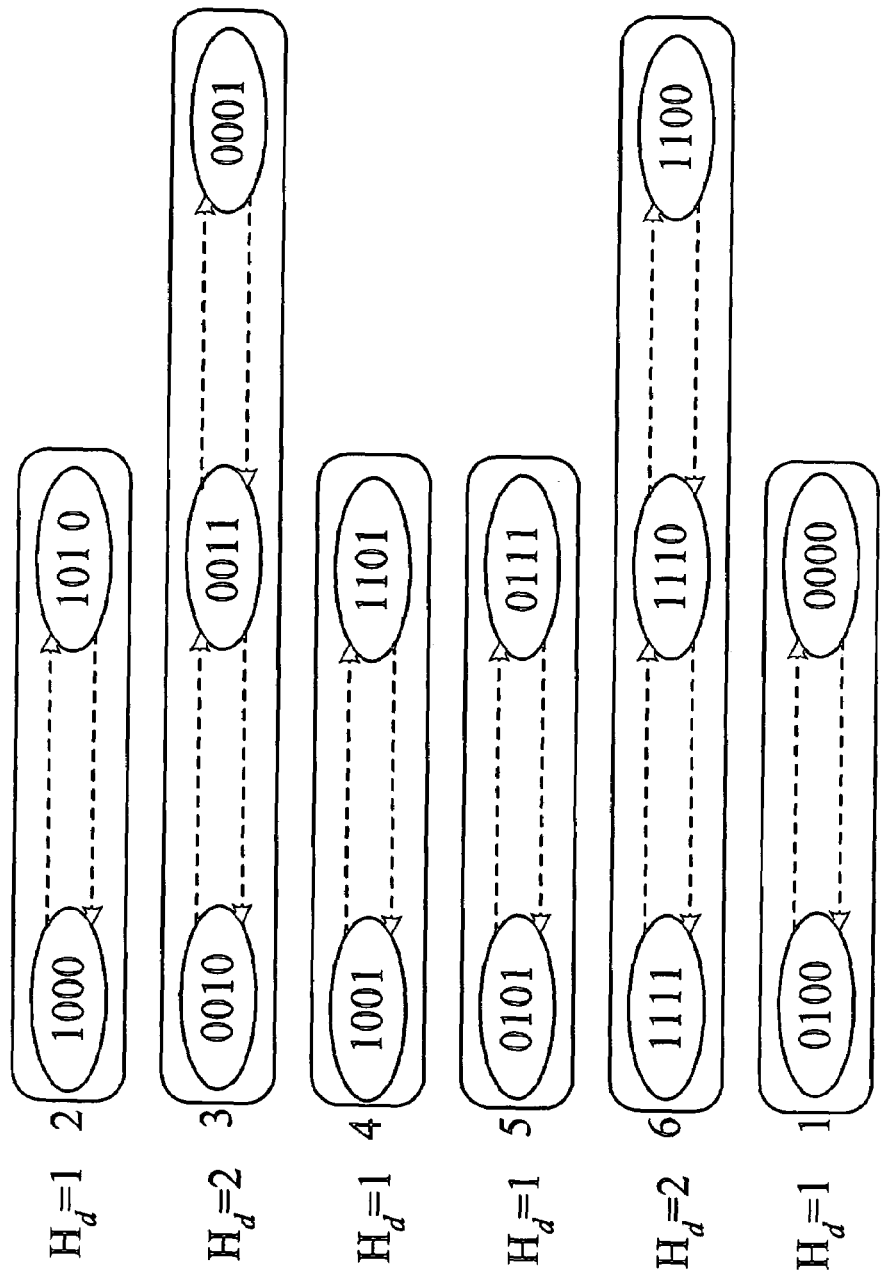
FIG. 6 is a schematic view of a decomposed self-timed transformation graph (STTG) in accordance with the invention.

FIG. 6 is a schematic view of a decomposed self-timed transformation graph (STTG) in accordance with the invention. The possible state decompositions for the states (0010, 0001) of the 3-rd TSG are (0010, 0000, 0001) and (0010, 0011, 0001). The first transposition is illegal since the state 0000 is used in 1-st TSG. In the same way, the possible state decompositions for the states (1111, 1100) of the 6-th TSG are (1111, 1101, 1100) and (1111, 1110, 1100). The first transposition is illegal since the state 1101 is used in the 4-th TSG Therefore, the state decomposition of (0010, 0001) and (1111, 1100) becomes (0010, 0011, 0001) and (1111, 1110, 1100), respectively. The complete STTG of modulo-3 element is shown in FIG. 6.

Once a STTG is decomposed, the corresponding quantum circuit based on Toffoli gates can be constructed. Quantum wires (i.e. quantum operations) based on Toffoli gates can be generated by each state transposition of TSGs. Step (F) constructs a quantum Boolean circuit of the decomposed self-timed transformation graph (STTG).

Taking the first TSG (labeled as 2) of the STTG, shown in FIG. 6, as an example, the states in the TSG are 1000 and 1010, and S=1000^1010=1000 so the 1-st qubit uses the one-controlled-gate (denoted by closed circles, ○). Similarly, since R=~(1000∨1010)=0101, the 2-nd and 4-th qubits use the zero-controlled-gate (denoted by open circles, ○). Finally, I=1000⊕1010=0010 so the 3-rd qubit uses the target gate (denoted by open circles with plus sign inside, ⊕). Therefore a quantum Boolean circuit (QBC) of module-3 element can be constructed based on the Toffoli gates.

Figure 7:
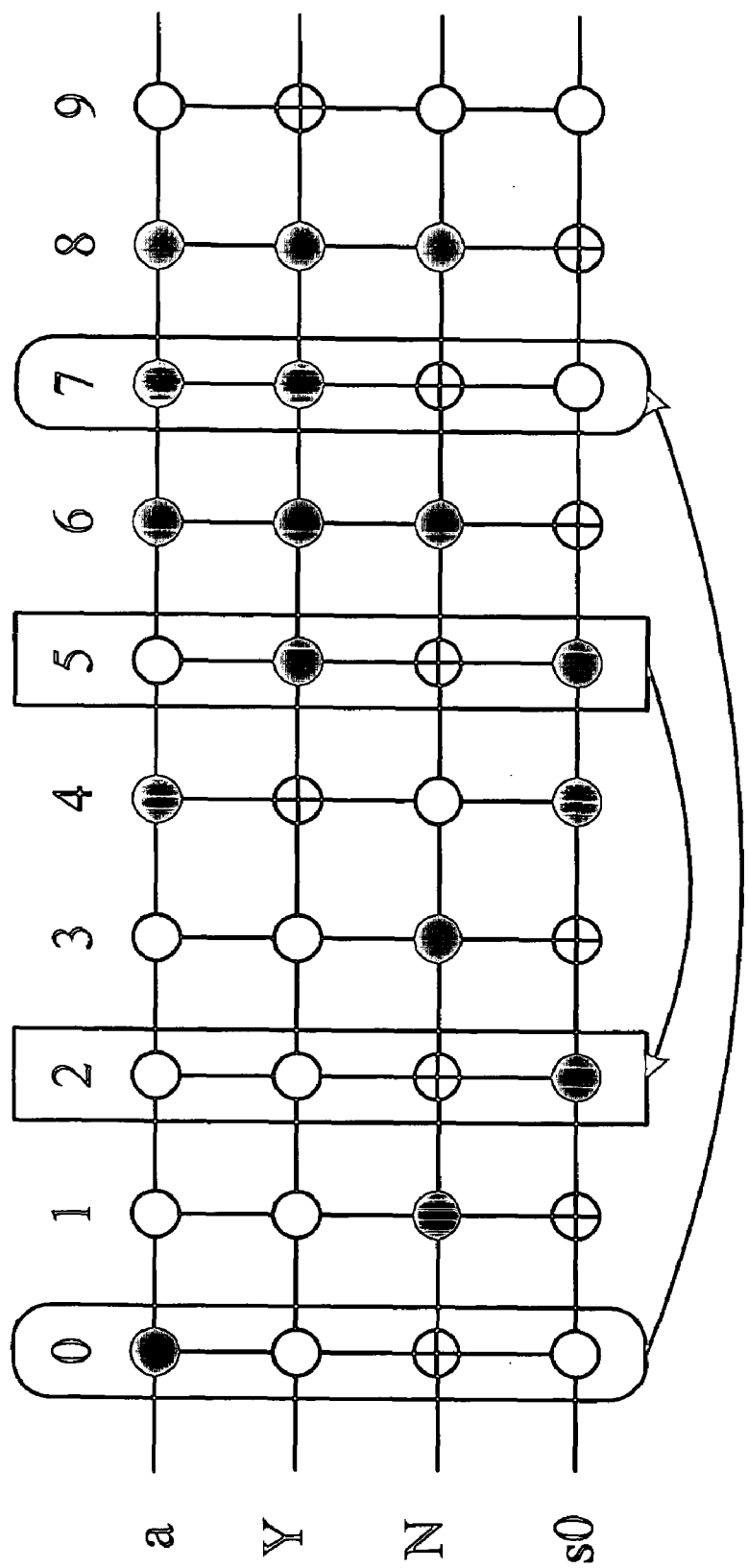
FIG. 7 is a schematic view of a quantum Boolean circuit (QBC) of a module-3 element in accordance with the invention.

FIG. 7 is a schematic view of a quantum Boolean circuit (QBC) of the module-3 element in accordance with the invention. As shown, the qubit a is the input, the qubits Y and N are the outputs and the qubit s0 is the auxiliary qubit for assisting in the work of circuits.

Step (G) optimizes the quantum Boolean circuit. The optimization of QBCs is to simplify and merge the Toffoli gates and wires in QBCs and thus reduce the complexity of circuits. Two reduction rules are used to optimize QBCs:
1. For any two quantum operations in a QBC, if they are identical then they can be removed from the QBC.
2. For any two quantum operations in a QBC, if they are identical except one qubit in which one of the logic gates is one-controlled gate and the other is zero-controlled gate then the different logic gates can be removed and these two operations can be merged into one.

Figure 8:
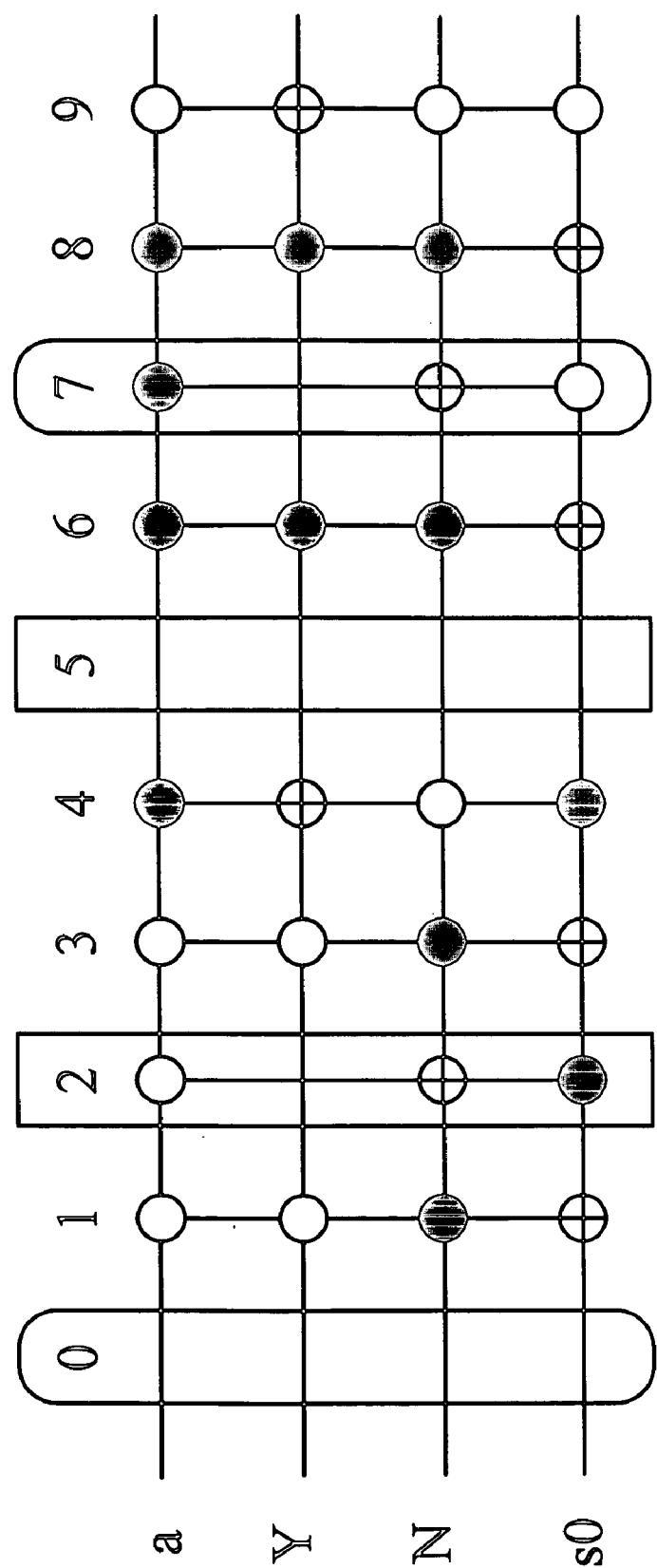
FIG. 8 is a schematic view of an optimized quantum Boolean circuit (QBC) of a module-3 element in accordance with the invention.

For example, the QBC of the modulo-3 element, shown in FIG. 7, has 10 quantum operations (labeling from left to right with 0 to 9). Applying the above reduction rules, the 0-th and 7-th and the 2-nd and 5-th quantum operations can be merged. Thus the number of quantum operations and gates are optimized from 10 to 8 and 40 to 30, respectively. FIG. 8 is a schematic view of an optimized quantum Boolean circuit (QBC) of the module-3 element in accordance with the invention.

In view of the foregoing, it is known that the invention provides a novel method to transfer self-timed circuit specifications into sequential quantum Boolean circuits. State graphs are used to describe the behaviors of self-timed circuits and then are translated into QBCs based on Toffoli gates by the technology of the present invention. A set of self-timed components is successfully and automatically synthesized into QBCs by the technology of the present invention. These QBCs can be used as building blocks to compose control-path components of self-timed systems.

Although the present invention has been explained in relation to its preferred embodiment, it is to be understood that many other possible modifications and variations can be made without departing from the spirit and scope of the invention as hereinafter claimed.

What is claimed is:

1. A method of automatic synthesis of sequential quantum Boolean circuits, which is used to transfer a self-timed circuit into a sequential quantum Boolean circuit and synthesize the sequential quantum Boolean circuit, the method comprising the steps of:
(A) transferring the self-timed circuit into a state graph having M state nodes, wherein each node in the state graph of the self-timed circuit represents one state of the self-timed circuit, each state of the self-timed circuit is labeled with a state binary code <s(1), s(2), . . . , s(n)>, the state binary code is formed by an input binary code function and an output binary code function and the value of s(i)∈{0,1}, the self-timed circuit has m-bits input and n-bits output, and the state binary code is ib(i)+ob(i), where + denotes a concatenation, ib(i) and ob(i) are the input and output binary codes function of a node i corresponding to a state of the self-timed circuit respectively, ib(i)∈{0,1}$^m$ and ob(i)∈{0,1}$^n$, and M is an integer;
(B) determining whether the state graph is reversible;
(C) encoding the M state nodes by using a unique state encoding when step (B) decides that the state graph is reversible, and producing a unique state coding reversible state graph;
(D) transferring the unique state coding reversible state graph (USCRSG) into a corresponding self-timed transformation graph;
(E) performing a state decomposition on the self-timed transformation graph and producing a decomposed self-timed transformation graph; and
(F) constructing a quantum Boolean circuit of the decomposed self-timed transformation graph.

2. The method as claimed in claim 1, further comprising the step of:
(G) optimizing the quantum Boolean circuit.

3. The method as claimed in claim 1, further comprising the step of:
(H) terminating the method when step (B) decides that the state graph is irreversible.

4. The method as claimed in claim 1, wherein the state graph is reversible if for any node j in the state graph either input of the node j is equal to 1, or input of the node j is large than 1 and for all source nodes of j, $i_1, i_2, \ldots, i_k$, $ob(i_1)$=$ob(i_2)$= . . . =$ob(i_k)$.

5. The method as claimed in claim 4, wherein the unique state encoding is applied to different auxiliary state bits which are appended to the state binary code to distinguish states in the state graph.

6. The method as claimed in claim 4, wherein the unique state coding reversible state graph specifies a sequential circuit with m-bit input, n-bit output and e edges, and the corresponding self-timed transformation graph comprises e transformation sub-graphs.

7. The method as claimed in claim 6, wherein each transformation sub-graphs comprises one source node and one target node connected to each other by two direct edges.

8. The method as claimed in claim 7, wherein state binary codes (SBC) of the source and target nodes are labeled with $ib(j)+ob(i)+ab(i)$ and $ib(j)+ob(j)+ab(j)$, respectively, where $ab(i)$ is the binary code function of the auxiliary state bits.

9. The method as claimed in claim 8, wherein when two nodes in a transformation sub-graphs have Hamming distances more than one, the transformation sub-graphs is decomposed and appropriate states are added between source node and the target node so that any adjacent states differ only one bit.

10. The method as claimed in claim 9, wherein constructing a quantum Boolean circuit of the decomposed self-timed transformation graph is based on Toffoli gates.

* * * * *